United States Patent [19]

Maeda et al.

[11] Patent Number: 5,233,466
[45] Date of Patent: Aug. 3, 1993

[54] ASTIGMATISM GENERATING DEVICE

[75] Inventors: Takanori Maeda; Susumu Nomura; Eiji Muramatsu, all of Saitama, Japan

[73] Assignee: Pioneer Electronic Corporation, Tokyo, Japan

[21] Appl. No.: 524,941

[22] Filed: May 18, 1990

[30] Foreign Application Priority Data

Sep. 29, 1989 [JP] Japan .................. 1-254986

[51] Int. Cl.⁵ .............. G02B 27/28; G02B 5/04; G11B 7/00
[52] U.S. Cl. ............ 359/493; 359/606; 359/638; 359/833; 369/112
[58] Field of Search ............... 350/169-174, 350/286, 287, 436; 250/201.1-201.8, 204; 369/45, 112, 122

[56] References Cited

U.S. PATENT DOCUMENTS

| 4,514,050 | 4/1985 | Stites | 350/286 |
| 4,525,034 | 6/1985 | Simmons | 350/286 |
| 4,778,984 | 10/1988 | Nakamura | 250/201.4 |
| 4,805,992 | 2/1989 | Maeda | 350/286 |
| 4,930,878 | 6/1990 | Bergner et al. | 350/286 |

Primary Examiner—Bruce Y. Arnold
Assistant Examiner—Thong Nguyen
Attorney, Agent, or Firm—Sughrue, Mion, Zinn, Macpeak & Seas

[57] ABSTRACT

An optical device with an improved efficiency in the transmission of light through the device is disclosed. The device having an optical element in a block shape which is made up of a first plane on which incident light is presented at a predetermined incidence angle. The incident light is transmitted through the first plane and is reflected off of another plane which is oriented at a predetermined angle with respect to a plane perpendicular to the first plane. The reflected light is next totally transmitted through an exit plane situated parallel to the first plane. The incidence angle is predetermined so that the angle at which the light is finally transmitted with respect to the exit plane is a polarization angle satisfying Brewster's rule. Therefore, at the exit plane, the light is totally transmitted and thus none of the light is reflected, resulting in a greatly improved degree of efficiency in the transmission of light through the device.

6 Claims, 3 Drawing Sheets

ASTIGMATISM GENERATING DEVICE

BACKGROUND OF THE INVENTION

The present invention relates to an astigmatism generating device to be used in an optical pickup device or the like in an optical video disk player and a CD player and more particularly to such an astigmatism generating device as is capable of enhancing the efficiency in the utilization of light through a reduction of the loss in the amount of light.

A conventional astigmatism generating device is disclosed in the Official Gazette No. 58316-1988 for Utility Model Laid Open (Application No. 151736-1986) and U.S. Pat. No. 4,805,992, and the device therein proposed is shown in FIG. 6. In the Figure, the existing astigmatism generating device 1 is shown to be composed of a first plane 11, which reflects the divergent light emitted from the light source 2 onto the disk 4 and also receives the incidence of the light reflected from the disk 4, a second plane 12, which is formed in parallel to the first plane 11 and radiates the light transmitted from the first plane 11, and a third plane 13, which is formed at a prescribed inclination angle $\alpha$ measured from the first plane 11 and reflects the light incident from the first plane 11 mentioned above to the second plane 12, the astigmatism generating device 1 thus having a construction which radiates the light from the second plane 12 mentioned above to the light receiving element 5.

The prescribed angle $\alpha$ of the third plane 13 mentioned above is set in such a way that the coma aberration of the light radiated from the second plane 12 will be approximately zero, and, specifically, the angle is set on the basis of the relationship expressed in the following equation (1):

$$\alpha = 90^\circ - (\beta_o/2) \qquad (1);$$

Wherein, $\beta_o$ represents the angle of the vertical angle $\beta$ at which the coma aberration exactly becomes zero in an astigmatism generating device which employs a wedge-shaped flat plate of which the vertical angle of the two planes is expressed as $\beta$.

The conventional device based on the construction described above can generate only astigmatism without producing any coma aberration since the prescribed angle $\alpha$ at which the third plane 13 is inclined at is set as described above.

The existing astigmatism generating device is composed as described above, and consequently the device presented a problem in that the efficiency in the utilization of light is deteriorated as the result of the deterioration of the light transmitting efficiency of the second plane 12 since a portion of the light reflected on the third plane 13 is again reflected by the second plane 12. Furthermore, the light reflected by the second plane 12 mentioned above is turned into stray light, causing unfavorable results, such as a deterioration of the accuracy of signal reproduction by the light receiving element 5.

In order to cause an improvement in the light transmitting efficiency of the second plane 12 mentioned above, it has been conventionally suggested to form a device construction which almost completely transmits the light reflected on the second plane 12, by the effect of antireflection coatings formed of magnesium fluoride, etc., with different indices of refraction, applied over the second plane 12. Such a process, however, presents a problem in that the application of such antireflection coatings results in an increased complexity of device construction, and thus requires more elaborate manufacturing processes, and so forth.

SUMMARY OF THE INVENTION

The present invention has been made in order to overcome the problems mentioned above, and the object of this invention consists of offering an astigmatism generating device which is capable of performing favorable reproduction of signals with a simple construction, improving the efficiency in the utilization of light through improvement of the light transmitting efficiency in terms of radiation and also preventing the unfavorable effects of stray light which results from reflection from a surface of the device.

According to the present invention, the light incident from a first plane is carried in incidence at such an angle of incidence upon the first plane that the angle of radiation from the second plane will form an angle of polarization (the Brewster's angle) and also achieves almost linear polarization of the light so that the electric field vector of the said linearly polarized light will be directed for its incidence in parallel to the plane of incidence. Hence, the astigmatism generating device is capable of completely eliminating the reflection of the light at the second plane, thereby making it possible to improve the efficiency in the transmission of light on the radiating plane and thus to prevent the unfavorable influence on signal reproduction of the stray light caused by reflection.

DETAILED DESCRIPTION OF THE PREFERRED EMBODIMENTS

Figure 1:
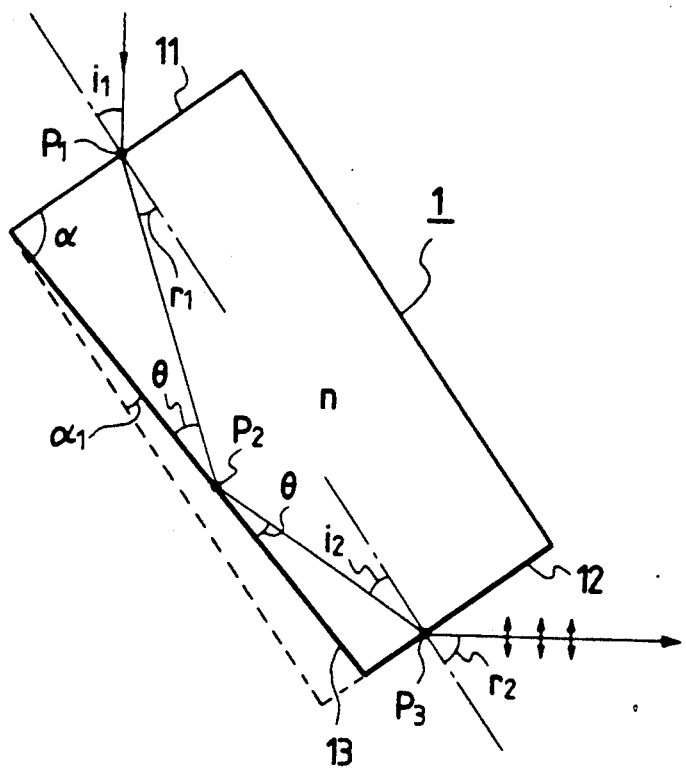
FIG. 1 presents a schematic construction drawing of an astigmatism generating device according to a preferred embodiment of the present invention.
Figure 6:
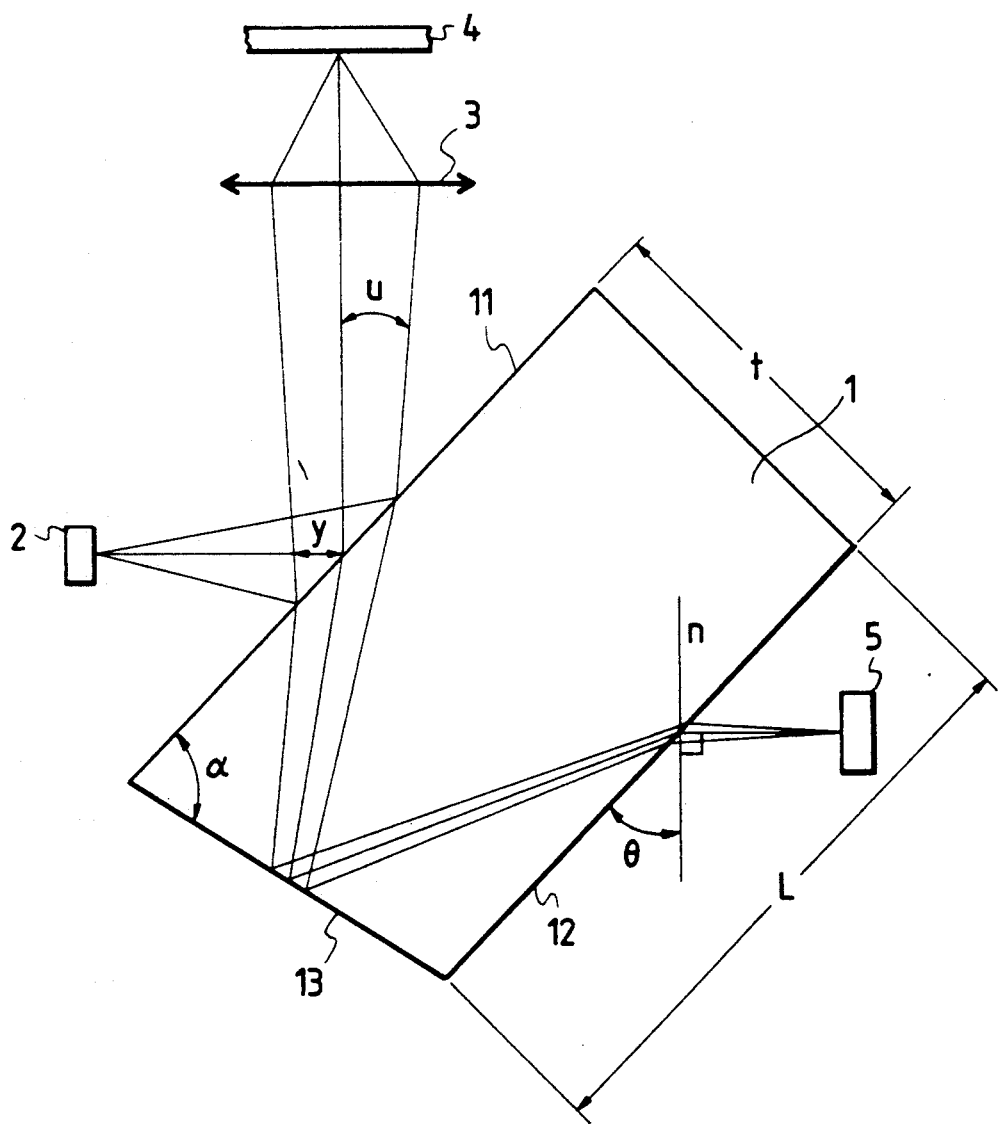
FIG. 6 illustrates a schematic construction drawing of a conventional astigmatism generating device.

In the following part, a description is made of one preferred example of an embodiment of the present invention as shown in FIG. 1. As shown in the Figure, the astigmatism generating device according to the present invention is provided with a first plane 11, upon which light is incident, a second plane 12, which is formed in parallel to the first plane 11 and radiates the light, and a third plane 13, which is formed with an inclination at a prescribed angle towards the plane perpendicular to the first plane 11 mentioned above and directs the light incident thereupon from the first plane 11 for the total reflection of the light towards the second plane 12, as in the case of the conventional device mentioned above (FIG. 6).

Moreover, in addition to the construction of the conventional device described above, the device proposed in the present example of the preferred embodiment of the present invention has a construction whereby the device receives the incidence of the light from the first plane 11 mentioned above at such an angle of incidence $i_1$ that the angle of radiation $r_2$ of the light radiated on the second plane 12 mentioned above assumes a polarization angle and also effects an approximately linear polarization of the incident light in such a manner that the electric field vector of the linearly polarized light will be in parallel to the plane of incidence (which is the plane including the normal line and the optical axis of the boundary plane, and this applies correspondingly to the plane of incidence used hereinbelow).

The angle of incidence of the light incident upon the first plane 11 mentioned above requires the relationship expressed in the following equation (2):

$$\sin i_1 = \sin(\tan^{-1} n) \pm 2\alpha_1 n \times \sqrt{1 - \left(\frac{\sin(\tan^{-1} n)}{n}\right)^2} \quad (2)$$

Wherein, n represents the index of refraction of the medium of which the device 1 in this preferred embodiment is composed, and $\alpha_1$ denotes a prescribed angle, the complement which is determined by the equation (1) explained with respect to the conventional (see a and a1 in FIG. 1 device and which the third plane 13 assumes in relation to the plane perpendicular to the first plane 11.

Next, the derivation of equation (2), which expresses the angle of incidence $i_1$ mentioned above, will follow:

First, the relationship between the angle of incidence $i_1$ and the angle of radiation $r_2$ is obtained.

At the point $P_1$, the following equation is established:

$$\sin i_a = n \cdot \sin r_1 \quad (3)$$

At the point $P_2$, the following equations are established:

$$\theta = r_1 + \alpha_1; \ i_2 = r_1 + 2\alpha_1 \quad (4)$$

At the point $P_3$, the following equation is established:

$$n \cdot \sin i_2 = \sin r_2 \quad (5)$$

From the equations (3), (4), and (5), the following equation is derived:

$$r_2 = \sin^{-1}(n \cdot \sin r_1 \cdot \cos 2\alpha_1 + n \cdot \cos r_1 \cdot \sin 2\alpha_1) \quad (6)$$

Here, $\cos 2\alpha_1 = 1$ and $\sin 2\alpha_1 = 2\alpha_1$ are obtained by approximation with $\alpha_1 \ll 1$, and the following equation is obtained:

$$r_2 = \sin^{-1}(\sin i_1 + 2\alpha_1 \sqrt{n^2 - \sin^2 i_1}) \quad (7)$$

Moreover, in order to set the angle of radiation $r_2$ at the polarization angle in the relationship expressed by the equation (7) given above, the relationship expressed in the following equations is required by the Brewster's rule as applied to the point $P_3$.

$$\tan r_2 = n$$

$$(r_2 = \tan^{-1} n) \quad (8)$$

That is to say, when this relationship is fulfilled, the electric field vector of the light incident upon the point $P_3$ will be parallel to the plane of incidence (which agrees with the surface of the paper in FIG. 1), and the transmissivity of the light attains 100 per cent, thereby reducing the reflected light to zero.

Then, the following equation is obtained from the equations (7) and (8) given above:

$$\{\sin i_1 + 2\alpha_1 \sqrt{n^2 - \sin^2 i_1} = \sin(\tan^{-1} n) \quad (9)$$
(equals, hereinafter, $N$).

Now, the equation (9) is arranged as follows:

$$(1 + 4\alpha_1^2) \cdot \sin^2 i_1 - 2N \cdot \sin i_1 + N^2 - 4\alpha_1^2 n^2 = 0 \quad (10)$$

Then, the solution of the equation (10) is found with respect to $\sin i_1$ as shown in the following:

$$\sin i_1 = \{N \pm \sqrt{N^2 - (1 + 4\alpha_1^2)(N^2 - 4\alpha_1^2 n^2)}\}/(1 + 4\alpha_1^2) \quad (11)$$

Thus, the part in the square root in the equation (11) is rearranged, and the following equation is obtained:

$$\sin i_1 = \{N \pm \sqrt{4(n^2 - N^2)\alpha_1^2 + 16\alpha_1^4 n^2}\}/(1 + 4\alpha_1^2) \quad (12)$$

Now that $\alpha_1^4$ may be disregarded, the following equations hold good:

$$\sin i_1 \approx \frac{N \pm 2\alpha_1 \sqrt{n^2 - N^2}}{1 + 4\alpha_1^2} \quad (13)$$

$$= \frac{(1 - 4\alpha_1^2)(N \pm 2\alpha_1 \sqrt{n^2 - N^2})}{(1 + 4\alpha_1^2)(1 - 4\alpha_1^2)}$$

$$= \frac{(1 - 4\alpha_1^2)(N \pm 2\alpha_1 \sqrt{n^2 - N^2})}{1 - 16\alpha_1^4} \quad (14)$$

Now, with $\alpha_1^2$, $\alpha_1^4$, being disregarded, the following equation is derived:

$$\sin i_1 \approx N \pm 2\alpha_1 n \sqrt{1 - \left(\frac{N}{n}\right)^2} \quad (15)$$

Since $N = \sin(\tan^{-1} n)$, the following equation is ultimately obtained:

$$\sin i_1 \approx \sin(\tan^{-1} n) \pm 2\alpha_1 n \times \sqrt{1 - \left(\frac{\sin(\tan^{-1} n)}{n}\right)^2}$$

Hence, the equation (2) given above can be obtained.

When specific numerical values are applied to the equation (2) given above, i.e. $\alpha_1 = 1.2° = 0.0209$ radians, with $n = 1.5$, then the angle of incidence $i_1$ equals 62.2° (or 51.2°).

Moreover, since it is required that the electric field vector in the incident light be parallel to the plane of incidence at the point $P_3$ mentioned above, it is also required that the light incident upon the point $P_1$ on the first plane 11 is almost linearly polarized and that the electric field vector of this linearly polarized light is parallel to the plane of incidence.

Figure 2:
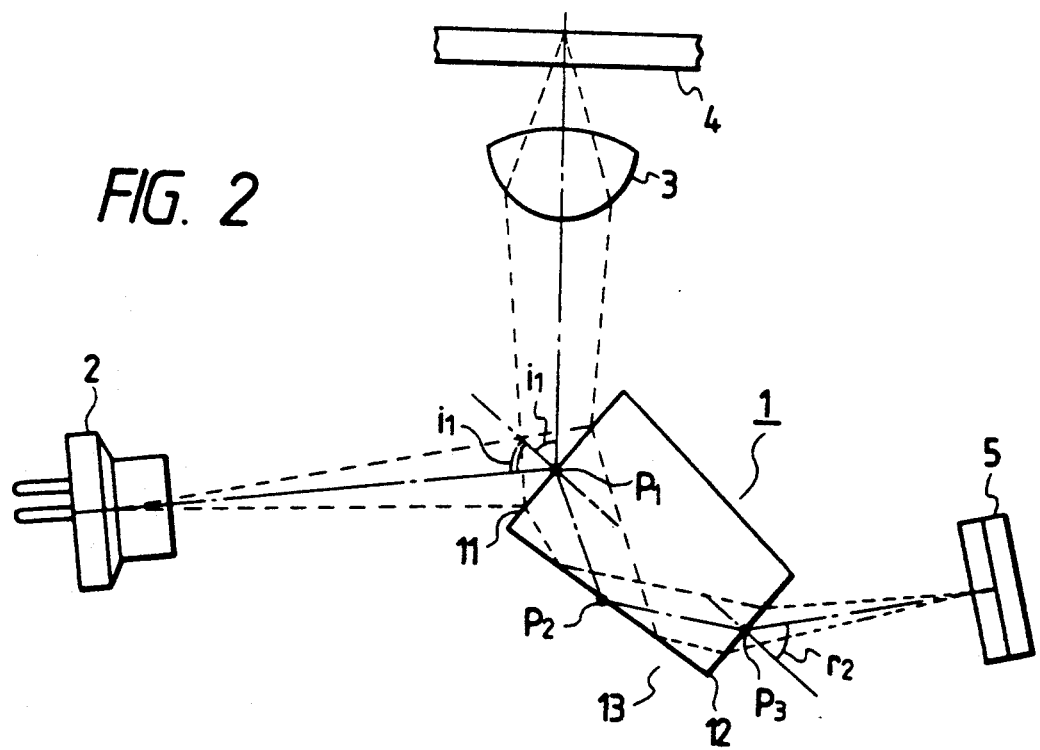
FIG. 2 shows the construction of the device according to an embodiment of the present invention as applied to an optical pickup unit.
Figure 3:
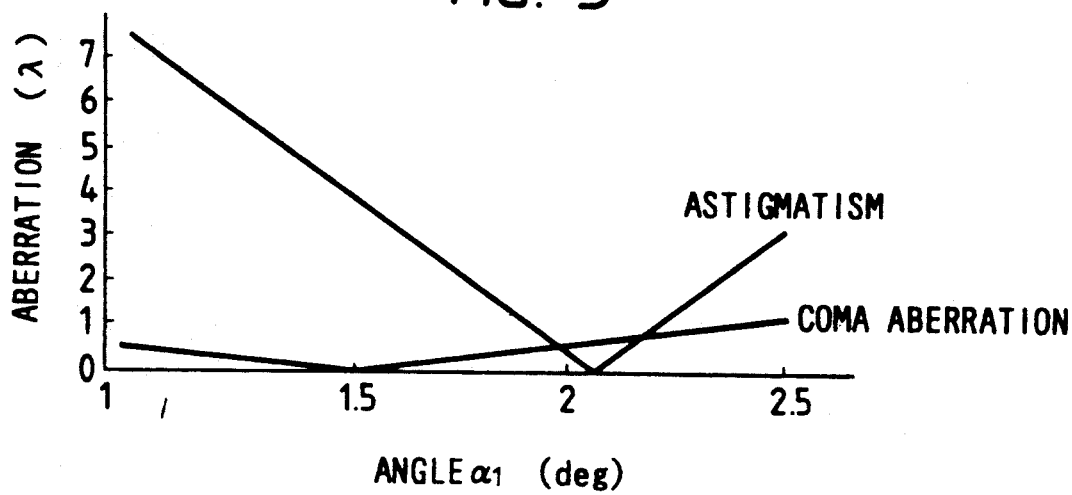
FIG. 3 shows the characteristics of the astigmatism and those of coma aberration of the device according to the present invention.
Figure 4A:
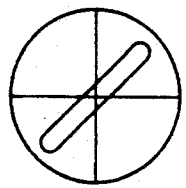
FIGS. 4 (a), (b), and (c) illustrate the received light spots, respectively.
Figure 4B:
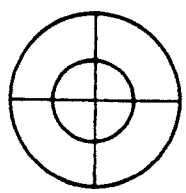
Figure 4C:
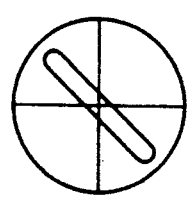

Next, reference is made to FIG. 2 through FIG. 4 for a description of the operations performed by the astigmatism generating device embodying the present invention and applied to an optical pickup unit.

First, linearly polarized light in parallel with the plane of incidence of the first plane 11 is radiated at the angle of incidence $i_1$ from the light source 2, and the light is reflected on the first plane 11, being thereby directed for its incidence into the object lens 3. This object lens 3 converges the linearly polarized light mentioned above and radiates the converged light onto the disk 4. The linearly polarized light is reflected by the disk 4 and is turned into a converged flux of light again by the object lens and is transmitted for its incidence at the angle of incidence $i_1$ onto the first plane 11 in the form of an electric field vector oscillating in parallel with the plane of incidence on the first plane 11.

The linearly polarized light refracted at the point $P_1$ on this first plane 11 is directed for total reflection on the third plane 13 for its radiation towards the second plane 12.

The linearly polarized light reflected on the third plane 13 is refracted at the point $P_3$ on the second plane 12, and the light so refracted is radiated at an angle of refraction $r_2$.

The linearly polarized light radiated from this second plane 12 has its electric field vector directed in parallel with the plane of incidence (i.e. in parallel with the plane of the paper in FIG. 1 and FIG. 2), with its angle of refraction $r_2$ being the angle of polarization. Therefore, the light is radiated at the transmissibility rate of 100 per cent.

Furthermore, the linearly polarized light radiated from this second plane 12 is sent forth with the coma aberration at zero since the third plane 13 is set at an inclination of a prescribed angle $\alpha_1$ in relation to the plane perpendicular to the first plane 11 and the second plane 12. This relation is illustrated in FIG. 3, and the prescribed angle $\alpha_1$ at which the coma aberration becomes zero is set on this basis.

The linearly polarized light radiated as mentioned above is directed so that it is incident onto the light receiving element 5.

Figure 5:
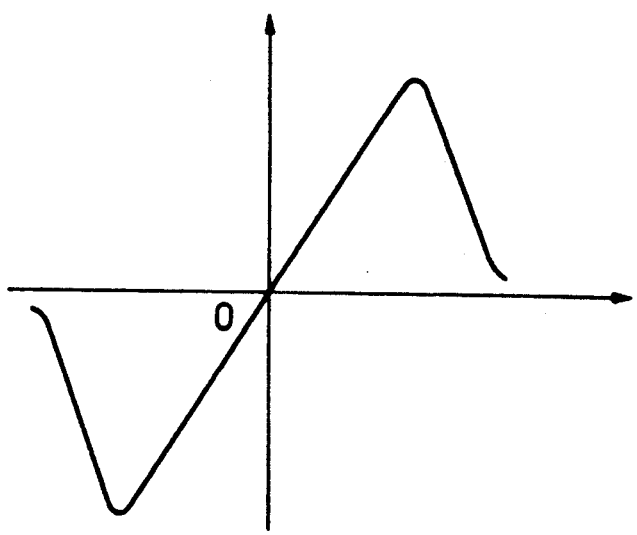
FIG. 5 presents the characteristics of a focusing error signal in a light receiving element.

Also, the state of the astigmatism generated with the device 1 according to the preferred embodiment is described with reference to FIGS. 4 (a) through 4 (c). The shape of the light spot formed on the basis of the astigmatism produced by the device 1 according to the preferred embodiment will be approximately circular in the state of being converged into focus (as shown in FIG. 4(b), but the shape of the light will be approximately oblong with the longer diameter being positioned vertically (as shown in FIG. 4 (a)) or laterally (as shown in FIG. 4 (c) when the light is too close to or too remote from the in-focus position. Accordingly, it is possible to generate a focusing error signal (in FIG. 5) by dividing the light receiving element 5 into four sectors, as shown for example in FIG. 4, and by calculating the difference between the sums of the output from the element as measured on the diagonal lines for such a division.

While the example of the preferred embodiment mentioned above has been described with respect to an optical pickup unit, the device may be so constructed as to be used in various other types of optical signal input equipment or the like.

Also, through the example of the preferred embodiment described above has a construction which achieves the total reflection of the light on the third plane, it is not necessarily required to effect the total reflection of the light, and it is possible to set up varying degrees of reflection as determined in relation to each of the first plane and the second plane.

Furthermore, the example of the preferred embodiment given above is provided with a half mirror structure on its first plane 11, but it is also possible to form polarizing coatings and thereby provide the function of a beam splitter.

Moreover, the example of the preferred embodiment described above is an example wherein astigmatism is generated in order to generate a focusing error signal. Yet, this invention offers its favorable applicability also to the rectification of the astigmatism at work in the semiconductor laser, for example, and also to the extension of the flux of light in one direction in such machines as laser beam printers.

As described hereinabove, the present invention offers a construction whereby the light incident from the first plane is directed for its incidence at such an angle of incidence on the first plane as will set the angle of radiation from the second plane to form a polarization angle and whereby the incident light is almost linearly polarized in such a manner as to direct the electric field vector of the said linearly polarized light to run in parallel with the plane of incidence, these meritorious features of the present invention making it possible completely to eliminate the reflection of light otherwise appearing on the second plane, to improve the efficiency in the transmission of light on the radiating plane, and to inhibit the unfavorable influence otherwise exerted by the stray light resulting from such reflection.

In addition, the present invention makes it possible to attain an improvement in the efficiency of the transmission of light without applying any coating, such as an antireflection film, and therefore produces the advantage that favorable reproduction of signals can be attained with a simple construction.

We claim:

1. An astigmatism generating device having an optical element in a block shape which is provided with a first plane upon which light is incident, a second plane formed parallel to said first plane for radiating light, and a third plane, for reflecting light incident from said first plane towards said second plane, said third plane formed with an inclination at such a prescribed angle $\alpha_1$, with respect to a plane perpendicular to said first plane, as will render the coma aberration of the light emitted from the second plane approximately zero, wherein said device further comprises:
   direction means for directing the light incident thereon from said first plane so as to achieve the incidence of said light at such an angle of incidence that the radiating angle of the light radiated from said second plane will be at a Brewster's angle;
   polarization means for polarizing the light into an approximately straight line; and
   arrangement means for arranging the incidence of the light so that an electric field vector of the linearly polarized light will be parallel to said first plane.

2. An astigmatism generating device according to claim 1, wherein said astigmatism generating device is more specifically characterized in that the angle of incidence $i_1$ of the first plane is expressed in terms of said angle $\alpha_1$ and the index of refraction, n, of the medium of which said device is composed by the equation:

$$\sin i_1 \simeq \sin(\tan^{-1} n) \pm 2\alpha_1 n \times \sqrt{1 - \left(\frac{\sin(\tan^{-1} n)}{n}\right)^2}$$

3. A device as claimed in claim 1 further comprising a light receiving element for receiving the linearly polarized light radiated from said second plane.

4. A device as claimed in claim 1 wherein said light incident from said first plane is totally reflected by said third plane towards said second plane.

5. A device as claimed in claim 1 wherein said light incident from said first plane is partially reflected by said third plane towards said second plane.

6. An optical device having an optical element in a block shape which is provided with a first plane upon which light is incident, a second plane formed parallel to said first plane for radiating light, and a third plane, for reflecting light incident from said first plane towards said second plane, said third plane formed with an inclination at such a prescribed angle $\alpha_1$, with respect to a plane perpendicular to said first plane, as will render the coma aberration of the light emitted from the second plane approximately zero, wherein said device further comprises:

direction means for directing the light incident thereon from said first plane so as to achieve the incidence of said light at such an angle of incidence that the radiating angle of the light radiated from said second plane will be at a Brewster's angle;

polarization means for polarizing the light into an approximately straight line; and arrangement means for arranging the incidence of the light so that an electric field vector of the linearly polarized light will be parallel to said first plane.

* * * * *